(12) United States Patent
Svartz et al.

(10) Patent No.: US 7,891,679 B2
(45) Date of Patent: Feb. 22, 2011

(54) ADJUSTMENT ARRANGEMENT IN A SUSPENSION HANGER ASSEMBLY

(75) Inventors: Bjorn Svartz, Greensboro, NC (US); Peter Blonde, Greensboro, NC (US); Steve Surdhar, Greensboro, NC (US); Paul Patricio, Greensboro, NC (US)

(73) Assignee: Volvo Group North America, LLC, Greensboro, NC (US)

( * ) Notice: Subject to any disclaimer, the term of this patent is extended or adjusted under 35 U.S.C. 154(b) by 323 days.

(21) Appl. No.: 11/463,401

(22) Filed: Aug. 9, 2006

(65) Prior Publication Data
US 2008/0036167 A1 Feb. 14, 2008

(51) Int. Cl.
B60G 7/02 (2006.01)
B62D 17/00 (2006.01)

(52) U.S. Cl. .............................. 280/86.75; 280/124.175

(58) Field of Classification Search .......... 280/124.116, 280/124.128, 124.153, 124.175, 86.75, 124.16, 280/86.751, 86.754, 86.755; 267/260
See application file for complete search history.

(56) References Cited

U.S. PATENT DOCUMENTS

| | | | | |
|---|---|---|---|---|
| 4,267,896 A * | 5/1981 | Hendriksen | ............... | 280/86.75 |
| 4,736,964 A * | 4/1988 | Specktor | .................. | 280/86.75 |
| 4,971,352 A | 11/1990 | Jordan | | |
| 5,052,711 A | 10/1991 | Pirkey | | |
| 5,201,898 A | 4/1993 | Pierce | | |
| 5,403,031 A | 4/1995 | Gottschalk | | |
| 5,647,606 A * | 7/1997 | Jordan | .................... | 280/86.751 |
| 5,775,719 A * | 7/1998 | Holden | .................... | 280/86.75 |
| 6,367,826 B1 | 4/2002 | Klais | | |
| 6,457,728 B1 | 10/2002 | Klais | | |
| 6,659,479 B1 * | 12/2003 | Raidel et al. | ............. | 280/86.75 |
| 6,688,616 B1 | 2/2004 | Ziech | | |
| 6,688,617 B2 | 2/2004 | Chamberlin | | |
| 6,851,687 B2 * | 2/2005 | Klais | ..................... | 280/86.755 |
| 7,083,176 B2 * | 8/2006 | Soles et al. | ............ | 280/86.755 |
| 7,296,809 B2 * | 11/2007 | Zebolsky | .................. | 280/86.75 |
| 7,331,588 B2 * | 2/2008 | Johnson | .................. | 280/86.754 |
| 7,370,868 B2 * | 5/2008 | Genick, II | .............. | 280/86.753 |
| 2004/0108672 A1 * | 6/2004 | Enck | ...................... | 280/86.755 |
| 2005/0001397 A1 * | 1/2005 | Genick | .................. | 280/86.754 |
| 2005/0156398 A1 * | 7/2005 | Ramsey | ............... | 280/124.116 |

* cited by examiner

*Primary Examiner*—Paul N Dickson
*Assistant Examiner*—Karen Jane J Amores
(74) *Attorney, Agent, or Firm*—Michael Pruden; Martin Farrell

(57) ABSTRACT

An adjustment arrangement in a suspension hanger assembly that can be used to square the orientation of an axle with the travel direction of the incorporating vehicle. The adjustment arrangement includes a hanger bracket that has a pair of substantially parallel, spaced apart hanger legs projecting generally away from the vehicle and each of the hanger legs has an elongate aperture or slot that is mutually aligned, one with the other. A bushing pin is inserted through both elongate apertures with opposite end portions of the pin being similarly positioned in each of the apertures. A substantially squared orientation is established between the hanger bracket and the bushing pin. A pair of adjustment devices are provided, one each, in association with a respective end portion of the bushing pin. The devices are configured to synchronously move both end portions of the bushing pin to similar positions in the elongate apertures thereby maintaining the substantially squared orientation between the hanger bracket and the bushing pin. Each of the adjustment devices are arranged to be rotated about a floating axis relative to the hanger bracket and to have a tool-receiving aperture eccentrically located relative to that floating axis. The tool-receiving apertures are configured to simultaneously receive a common actuating tool for affecting synchronous rotation of the adjustment devices.

14 Claims, 4 Drawing Sheets

ADJUSTMENT ARRANGEMENT IN A SUSPENSION HANGER ASSEMBLY

TECHNICAL FIELD

The present invention relates to suspension assemblies for vehicles; and more particularly, to adjustment mechanisms for suspension hanger assemblies used for squaring the orientation of an axle of the vehicle to the travel direction.

BACKGROUND ART

In most wheel-based land vehicles and in particular heavy-duty trucks, the non-steering wheels are typically paired on axles that are connected to the vehicle by an appropriate suspension. These wheels may or may not be drive wheels interconnected with a transmission of the vehicle. In general, the vehicle's direction of travel is aligned with its long axis and the longitudinal axes of the axles are arranged to be squared or perpendicular thereto so that the rotating wheels turn in alignment with the travel direction. In this manner, excessive and abnormal tire wear is avoided, as is undue stress on the connections and components between the wheels and the vehicle. Still further, such aligned tracking of the wheels enhances vehicle stability by minimizing the imposition of transverse forces that misaligned tires can have on a traveling vehicle.

In order to avoid these problems associated with misaligned wheels, axles are usually interconnected to the incorporating vehicle using adjustable hanger assemblies that during manufacture, and later in the field, can be used to establish aligned wheel tracking with the vehicle's travel direction. Examples of alignment assemblies that enable the setting of a squared thrust angle are disclosed in U.S. Pat. Nos. 4,267,896, 5,201,898 and 6,659,479, each of which is expressly incorporated herein for the purpose of describing the present state of the art. There are, however, deficiencies associated with these designs. As will be appreciated by those persons skilled in this art, a common mode utilized in these examples for adjusting the relative orientation of an axle is to adjust the forward-backward position of a bush pin included in the interconnection between an end of the axle and the carrying vehicle. By moving one or both ends of an axle forward and/or backward relative to the carrying vehicle, the axle can be squared to the travel direction.

A common problem experienced in existing bushing adjustment mechanisms, such as those disclosed in the patents referenced above, is that a bushing pin can easily get crosswise and bind in its receiving hanger assembly. Though the axle can still be set in a squared orientation to the travel direction, such binding of the parts impedes the adjustment process and a set, misaligned bushing pin causes undue stress in the hanger assembly. Therefore, it has been recognized as desirable to provide an adjustment arrangement for the bushing pin in a hanger assembly that assures that the pin does not bind and remains in a substantially perpendicular relationship to the hanger assembly during axle-position adjustment. Furthermore, maintenance of this squared orientation assures that in the subsequent set configuration the bushing pin and the hanger assembly are prevented from being unduly stressed.

DISCLOSURE OF INVENTION

The present invention utilizes a unique configuration to synchronously move both ends of a bushing pin in a hanger bracket to assure that their squared relationship is maintained during and after repositioning of an associated axle. This prevents the pin from crosswise binding in the hanger assembly during adjustment and also prevents undue stress from being induced in the hanger assembly when set in a desired configuration.

In at least one embodiment, the present invention takes the form of an adjustment arrangement in a suspension hanger assembly that can be used to square the orientation of an axle with the travel direction of the vehicle upon which it is incorporated. The adjustment arrangement includes a hanger bracket that has a pair of substantially parallel, spaced apart hanger legs projecting generally away from the vehicle. Each of the hanger legs has an elongate aperture or slot that is mutually aligned, one with the other. A bushing pin is inserted through both elongate apertures with opposite end portions of the pin being similarly positioned in each of the apertures. In this manner, a substantially squared orientation is established between the hanger bracket and the bushing pin. A pair of adjustment devices is provided, one each in association with a respective end portion of the bushing pin. The devices are configured to synchronously move both end portions of the bushing pin to similar positions in the elongate apertures thereby maintaining the substantially squared orientation between the hanger bracket and the bushing pin. Furthermore, each of the adjustment devices are arranged to be rotated about a floating axis relative to the hanger bracket and to have a tool-receiving aperture eccentrically located relative to that floating axis. The tool-receiving apertures are configured to simultaneously receive a common actuating tool for affecting synchronous rotation of the adjustment devices.

In a further development of the invention, each adjustment device includes a washer having a main body and an extension tab oriented to project generally away from the vehicle and having the tool-receiving aperture extending therethrough.

Preferably, both tool-receiving apertures are substantially aligned with each other in order to accommodate the common insertion of a substantially straight actuating tool.

As illustrated, the tool-receiving apertures are hexagonally shaped and accommodate insertion of a hexagonally shaped wrench extension as the actuating tool.

In yet a further development, each hanger leg has a pair of stops between which the main body of the associated washer is bounded for floating rotation relative to that hanger leg. In this regard, the washer has a pair of opposite side surfaces, each of which is configured for sliding contact with one of the stops during floating rotation by the adjustment device. In the Figures, the pair of stops on a given leg is configured to substantially limit lateral movement (forward and backward relative to the travel direction of the vehicle) of the main body of the adjustment device.

In a further aspect, a releasable securing arrangement is provided and configured to fix the bushing pin relative to the hanger bracket in desired settings.

In yet another aspect, an indicia system is included that indicates which of a plurality of relative positions between the bushing pin and the hanger bracket presently exists.

Through the use of the bushing pin adjustment arrangement system described hereinabove, stress is minimized in the suspension hanger assembly which prolongs the useful life of the mechanism, prevents the pin's binding in the hanger which can cause difficulties in the adjustment process and promotes stability in the incorporating vehicle by facilitating the squaring of axles to the travel direction. It should be further appreciated that by preventing binding of the bushing pin in the bracket, integrity of the joint is preserved.

BRIEF DESCRIPTION OF DRAWINGS

An exemplary embodiment of the present invention is illustrated in the accompanying drawings in which.

BEST MODE FOR CARRYING OUT THE INVENTION

Figure 1:
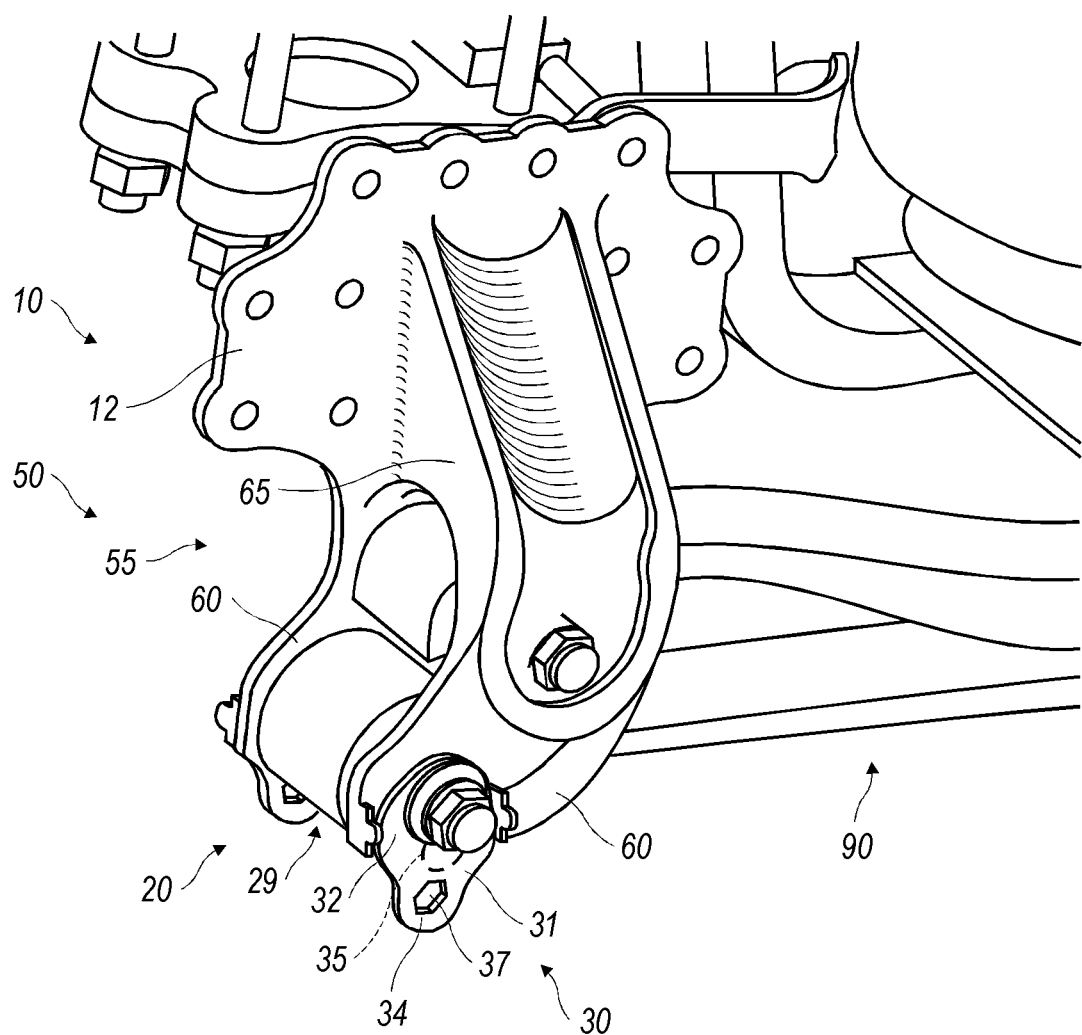
FIG. 1 is a perspective view of a suspension hanger assembly configured according to the teachings of the invention and shows an interconnected leaf spring and axle support.

Referring to FIG. 1, a support assembly 10 configured according to the present invention is shown for suspending a load bearing bushing 29 on a hanger bracket 55 of a hanger assembly 50 which constitutes part of a vehicular suspension. The hanger assembly 50 can be connected to the vehicle by a support portion or connective plate 12, typically at the frame of the vehicle. The hanger bracket 55 of the hanger assembly 50 is generally U-shaped with two hanger legs 60 projecting substantially away from the vehicle in a spaced-apart, essentially parallel orientation to one another. As shown, the legs 60 are joined together by the interconnection 65. Each leg 60 is shown as being of substantially plate-like construction, and extends in an essentially downward direction below the vehicle frame. This orientation and construction is preferred, but not required.

An elongate aperture or slot 70 is cut or otherwise formed in each of the two legs 60. A bushing assembly 20 includes a bushing pin assembly 23 extending through both elongate apertures 70 and is configured for translational movement along the longitudinal axes of the apertures 70. In the illustrated embodiment, long axes of the slots 70 are oriented to run predominantly in the forward-backward direction of the vehicle and in substantial alignment with the travel direction of the vehicle.

Figure 2:
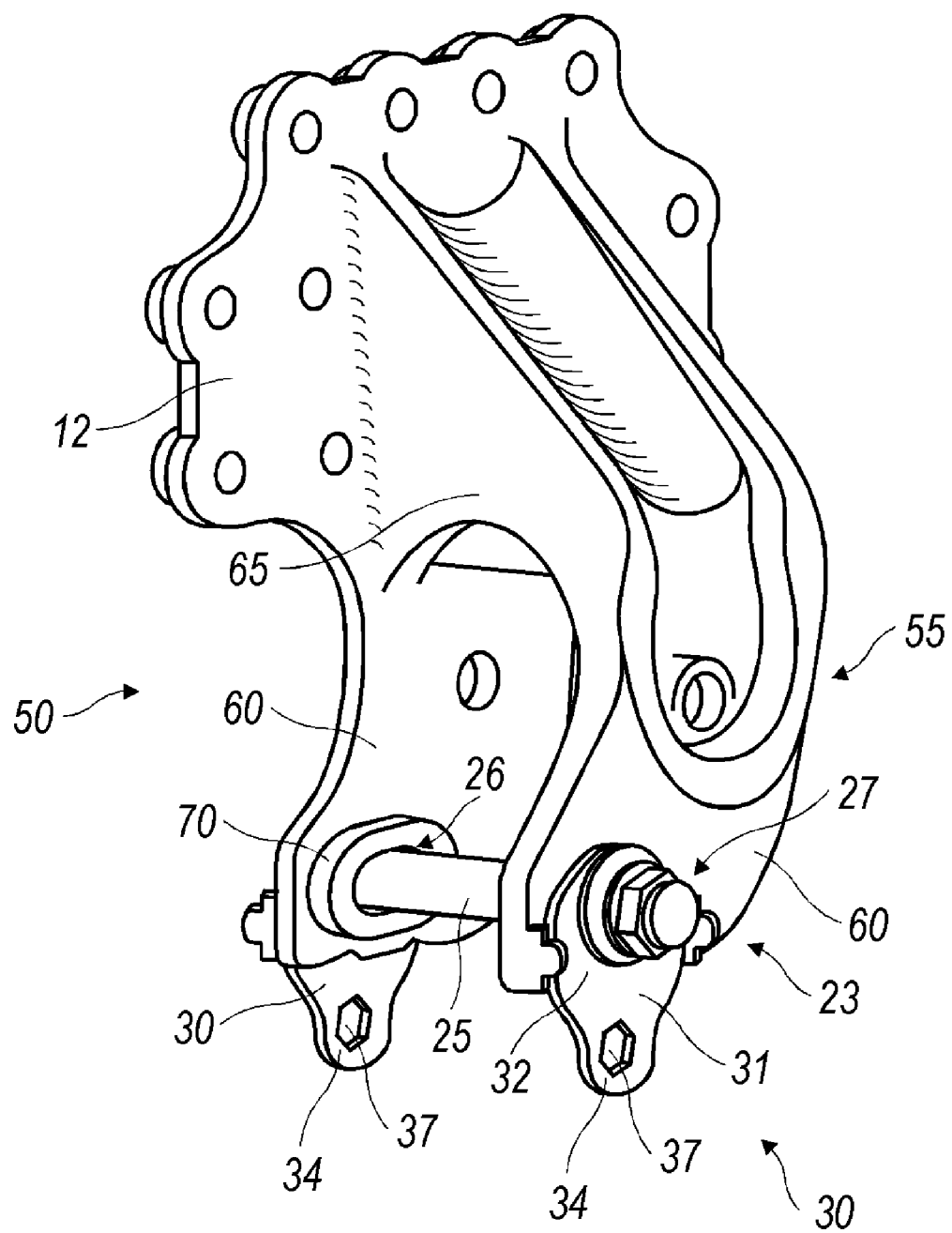
FIG. 2 is an outside perspective view of the suspension hanger assembly taken inwardly toward the vehicle.

As may be appreciated in FIG. 2, the bushing pin assembly 23 includes a bushing pin 25 having two opposite end portions 26. In the illustrated embodiment, the bushing pin 25 is a conventionally designed bolt having an integral head at one end, and being threaded at the opposite end. Once a desired setting position of the bushing assembly 21 is achieved relative to the hanger bracket 55, a nut 27 is tightened onto the threaded end portion 26 fixing the configuration.

The load bearing bushing 29 is installed upon the bushing pin 25 as the bushing pin assembly 23 is installed upon the hanger assembly 50 and is ultimately positioned between the two legs 60 of the hanger bracket 55. As will be appreciated by those skilled in the art, the bushing 29 is provided to support a pivoting member thereupon such as an eye of an axle support 90 as depicted in FIG. 1.

An adjustment arrangement 30 is established using two adjustment devices in the form of washers 31 that are each paired to and interconnected with a leg 60 of the hanger bracket 55. Each washer 31 is configured for predominantly rotational movement relative to the leg 60 with which it is associated about a floating rotational axis 35. In the present context, the term "floating rotational axis" is utilized to define a central area of the washer 31 including a collection or set of points about which the washer 31 variously rotates during the adjustment process.

Each adjustment washer 31 has a bushing pin aperture 33 eccentrically located relative to the floating rotational axis 35. During assembly, the bushing pin apertures 33 are aligned with the elongate apertures 70 and the bushing pin 25 is inserted with the bushing 29 positioned between the legs 60 of the hanger bracket 55.

Figure 3:
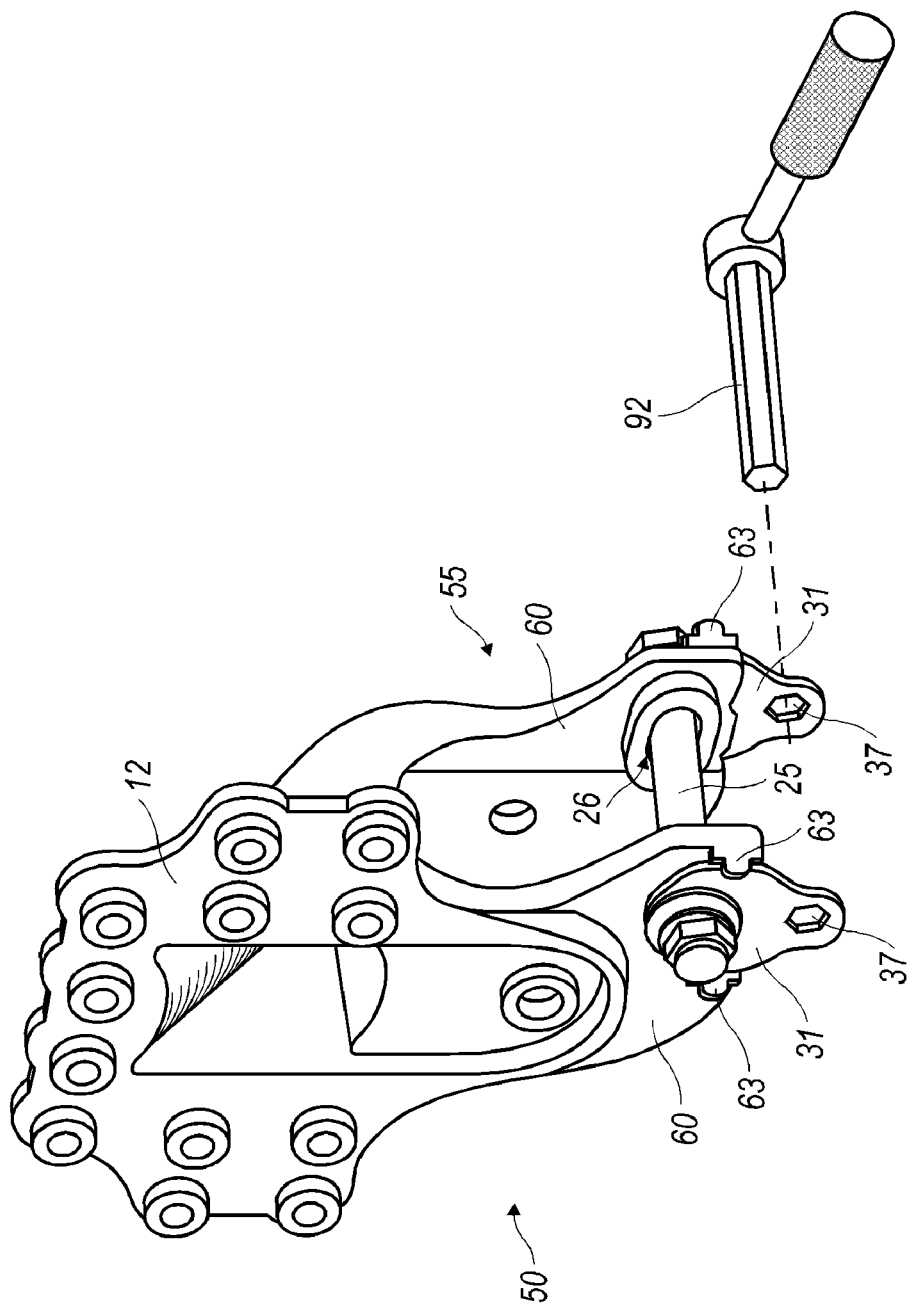
FIG. 3 is an inside perspective view of the suspension hanger assembly taken outwardly from the vehicle and showing a hexagonally shaped actuator posed for insertion in tool-receiving apertures.
Figure 4:
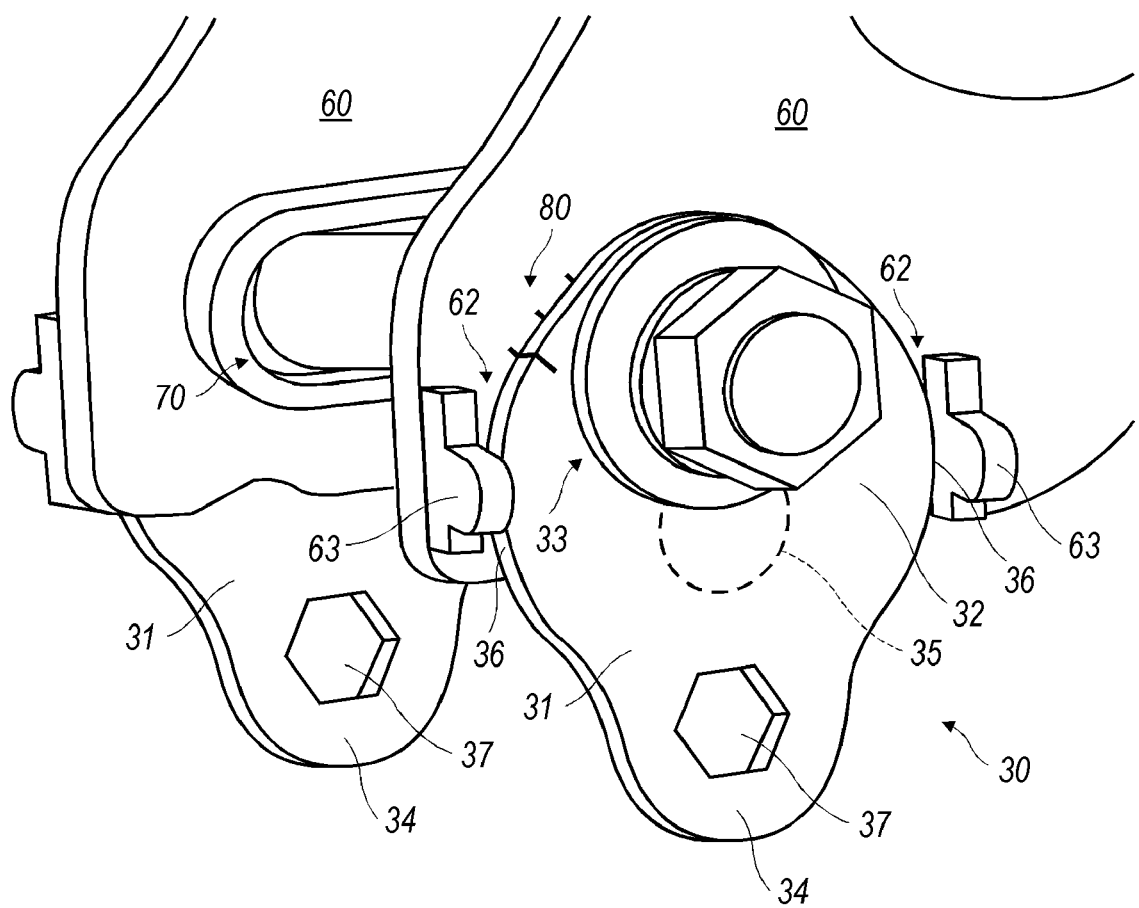
FIG. 4 is an assembled perspective view of a pair of adjustment washers installed upon a hanger assembly showing details of the washers and tool-receiving apertures extending therethrough.

As illustrated in FIG. 4, each washer 31 is generally keyhole shaped with the larger upper portion establishing a main body 32 of the washer 31 and the narrowed lower portion establishes an extension tab 34. An actuator receiver 37 is eccentrically position relative to the floating rotational axis 35 in the extension tab 34. The tabs 34 extend below the lower edges of the legs 60 and the actuator receivers 37 are aligned with one another for receiving a common actuator 92 (see FIG. 3) that is used to cause synchronous rotation of the washers 31 about the floating rotational axis 35. This rotation translates the bushing pin assembly 23 in the elongate apertures 70 while maintaining the bushing pin 25 and a substantially perpendicular or squared orientation to the long axis of the apertures 70. As described above, maintaining this perpendicular orientation is important for preventing the pin assembly 23 and bushing 29 from binding during adjustment. Still further, maintenance of this squared orientation assures that the bushing assembly 20 will not be set in a twisted or torqued configuration in the hanger bracket assembly 50 when the bushing pin assembly 23 is tightened.

The adjustment washer 31 rotates within a boundary-defined space 62. Boundary elements or stops 63 laterally restrain the washer 31 by contact with side surfaces 36 of the washer 31 while at the same time permitting floating rotation. This configuration permits the bushing pin 25 to linearly translate within the track of the elongate apertures 70 under the influence of the washers' 31 rotation.

Referring to FIG. 3, the actuator receivers 37 take the form of aligned hexagonally shaped apertures through which a substantially straight, conformance-shaped hexagonal toolbar or actuator 92 is inserted. As illustrated, a preferred embodiment of the actuator 92 is a hexagonally shaped tool extension of a ratcheting torque wrench. The tool's shape, however, can be any that establishes a nonrotating interconnection; for instance octagonal or even an unusual proprietary shape such as a pentagon. Such a proprietary shape would assist in avoiding unauthorized operation of the hanger assembly. Once inserted in both actuator receivers 37, the toolbar 92 can be pushed or pulled from the wrench handle to synchronously rotate the adjustment washers 31. By simultaneously rotating the adjustment washers 31, both ends 26 of the bushing pin 25 are similarly translated in the elongate apertures 70 which maintains the perpendicular orientation of the bushing pin assembly 23 relative to be hanger bracket 55 and thus avoids any binding tendencies. Furthermore, because the tool 92 acts on both washers 31 at the same time, the torque that would otherwise be instituted in the hanger assembly 50 if only one washer 31 were alone engaged is avoided. Because of this evenly distributed application of force that the actuation of both adjustment washers 31 allows, the individual washers 31 may be less heavily constructed for cost savings while at the same time supplying sufficient structural integrity for proper operation.

An indicia system 80 may be optionally incorporated into the support assembly 10 to facilitate settings into prescribed orientations. As may be appreciated in FIG. 4, the system 80 can take the form of an indicator line provided on the washer 31 and which is configured to come into alignment with different ones of a plurality of setting lines provided on the leg 60 of the hanger bracket 55.

The invention claimed is:

1. An adjustment arrangement in a suspension hanger assembly useable for squaring the orientation of an axle with the travel direction of an incorporating vehicle, said adjustment arrangement comprising:
    a hanger bracket having a pair of substantially parallel, spaced apart hanger legs projecting generally away from the incorporating vehicle, each of said hanger legs having a elongate aperture that is mutually aligned with the other;
    a bushing pin inserted through both elongate apertures with opposite end portions of said pin being similarly positioned in respective elongate apertures thereby establishing a substantially squared orientation between said hanger bracket and said bushing pin;
    a pair of adjustment devices, one each associated with a respective end portion of said bushing pin and configured to synchronously move both end portions of said bushing pin to similar positions in said elongate apertures thereby maintaining said substantially squared orientation between said hanger bracket and said bushing pin;
    each of said adjustment devices being rotatable about a floating axis relative to the hanger bracket and having a tool-receiving aperture eccentrically located relative to the floating rotational axis, each of said tool-receiving apertures being configured to simultaneously receive a single actuating tool for affecting synchronous rotation of said adjustment devices; and
    each adjustment device comprising a washer having a main body and an extension tab oriented to project generally away from the incorporating vehicle and through which said tool-receiving aperture extends.

2. The adjustment arrangement as recited in claim 1, wherein both tool-receiving apertures are substantially aligned with each other thereby accommodating common insertion of a substantially straight actuating tool.

3. The adjustment arrangement as recited in claim 1, wherein both tool-receiving apertures are hexagonally shaped thereby accommodating insertion of a hexagonally shaped wrench extension as said single actuating tool.

4. The adjustment arrangement as recited in claim 1, wherein each hanger leg includes a pair of stops between which the main body of a respective adjustment device is bounded for floating rotation relative to said hanger leg.

5. The adjustment arrangement as recited in claim 4, wherein said main body of the respective adjustment device has a pair of opposite side surfaces, each of said side surfaces configured for sliding contact with a respective one of said pair of stops during floating rotation by said adjustment device.

6. The adjustment arrangement as recited in claim 5, wherein said pair of stops is configured to substantially limit lateral movement of said main body of said adjustment device.

7. The adjustment arrangement as recited in claim 1, further comprising a releasable securing arrangement configured to fix said bushing pin relative to said hanger bracket in desired settings.

8. The adjustment arrangement as recited in claim 1, further comprising an indicia system configured to indicate which of a plurality of relative positions between said bushing pin and said hanger bracket presently exists.

9. An adjustment arrangement in a suspension hanger assembly useable for squaring the orientation of an axle with the travel direction of an incorporating vehicle, said adjustment arrangement comprising:
    a hanger bracket having a pair of substantially parallel, spaced apart hanger legs projecting generally away from the incorporating vehicle, each of said hanger legs having a elongate aperture that is mutually aligned with the other;
    a bushing pin inserted through both elongate apertures with opposite end portions of said pin being similarly positioned in respective elongate apertures thereby establishing a substantially squared orientation between said hanger bracket and said bushing pin;
    a pair of adjustment devices provided with bushing pin apertures aligned with the elongated apertures and the bushing pin, whereby each adjustment device is associated with a respective end portion of said bushing pin and configured to synchronously move both end portions of said bushing pin to similar positions in said elongate apertures, thereby maintaining said substantially squared orientation between said hanger bracket and said bushing pin; and
    each of said adjustment devices being rotatable about a floating axis relative to the hanger bracket and having a tool-receiving aperture eccentrically located relative to the floating rotational axis, each of said tool-receiving apertures being configured to simultaneously receive a single actuating tool for affecting synchronous rotation of said adjustment devices.

10. The adjustment arrangement as recited in claim 9, further comprising an indicia system configured to indicate which of a plurality of relative positions between said bushing pin and said hanger bracket presently exists.

11. The adjustment arrangement as recited in claim 10, wherein the indicia system includes an indicator line provided on at least on at least one of the adjustment devices and a plurality of setting lines provided on at least one of the legs of the hangar bracket, whereby the indicator line is configured to come into alignment with different ones of the plurality of setting lines according to the relative positions between said bushing pin and said hangar bracket.

12. The adjustment arrangement as recited in claim 9, wherein each hanger leg includes a pair of stops between which the main body of a respective adjustment device is bounded for floating rotation relative to said hanger leg.

13. The adjustment arrangement as recited in claim 12, wherein said main body of the respective adjustment device has a pair of opposite side surfaces, each of said side surfaces configured for sliding contact with a respective one of said pair of stops during floating rotation by said adjustment device.

14. The adjustment arrangement as recited in claim 13, wherein said pair of stops is configured to substantially limit lateral movement of said main body of said adjustment device.

* * * * *